UNITED STATES PATENT OFFICE.

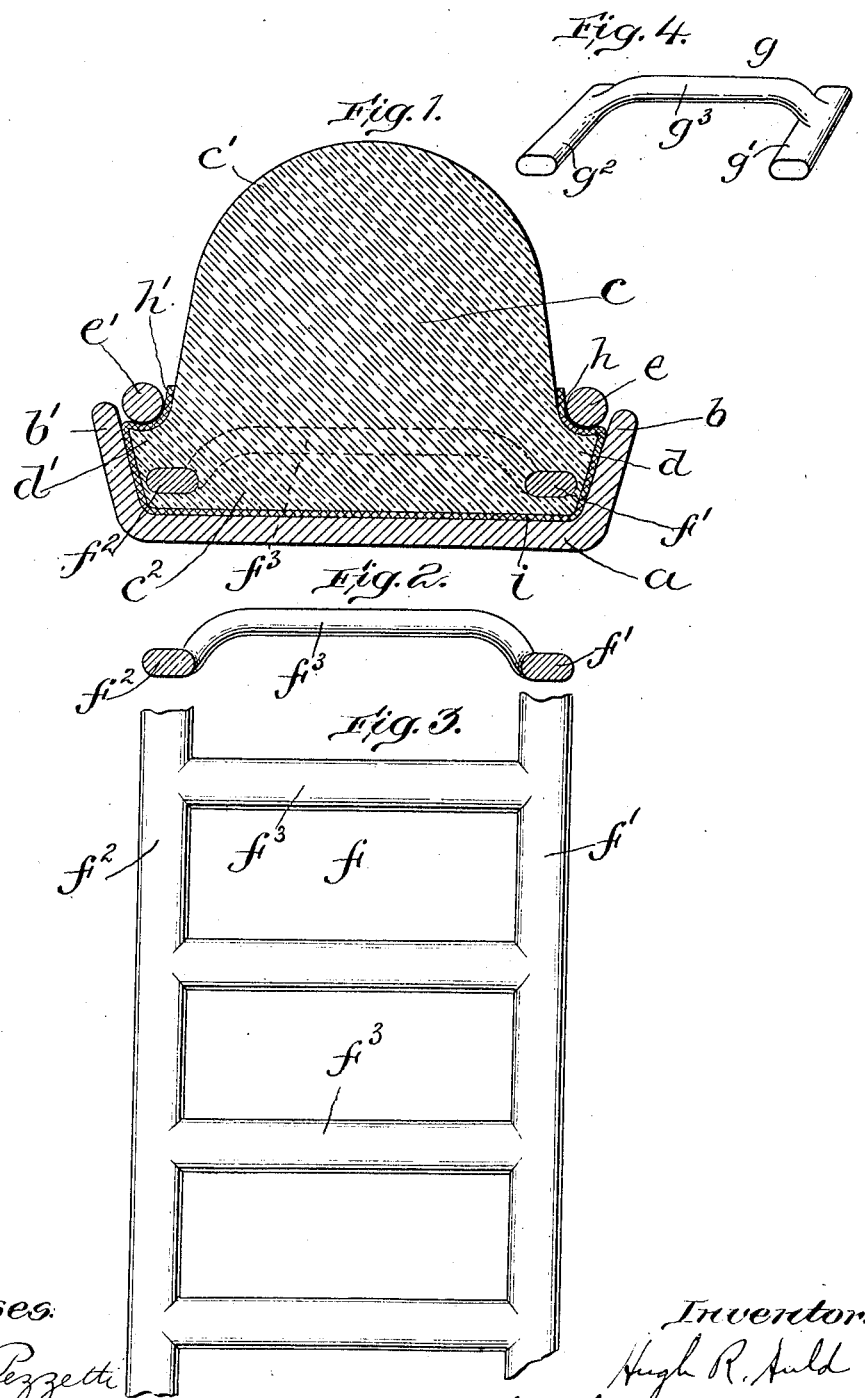

HUGH R. AULD, OF BOSTON, MASSACHUSETTS.

VEHICLE-TIRE.

No. 812,321. Specification of Letters Patent. Patented Feb. 13, 1906.

Application filed February 13, 1905. Serial No. 245,364.

*To all whom it may concern:*

Be it known that I, HUGH R. AULD, of Boston, in the county of Suffolk and State of Massachusetts, have invented certain new and useful Improvements in Vehicle-Tires, of which the following is a specification.

This invention has for its object to provide in a tire having flanges to support retaining-wires, which hold the tire into the rim-channel of a vehicle-wheel, an improved device for stiffening the base of a tire and preventing it from being pulled out from under the retaining-wires when lateral stresses are applied to the tread portion, and also to provide means for resisting the tendency of the flanges to tear away from the body of the tire when such stresses are applied, as when the vehicle turns a corner sharply.

The invention comprises the novel features which I will now proceed to describe and claim.

Of the accompanying drawings, Figure 1 represents a cross-sectional view of a tire embodying my invention and the rim-channel of a vehicle-wheel and the retaining-wires for holding the tire in place in the channel. Figs. 2 and 3 represent, respectively, a sectional view and a plan view of a portion of the metal stiffener plate or grid which is embedded in the base portion of the tire and acts to stiffen the same. Fig. 4 represents a perspective view of a modified form of stiffener.

The same reference characters indicate the same parts in all the figures.

$a$ represents the usual metal rim-channel, which is applied to a vehicle-wheel when the latter is to be fitted with rubber tires and is provided with lateral flanges $b$ $b'$.

$c$ is the tire, which has the tread portions $c'$ and base portion $c^2$, the latter portion having at its side the flanges $d$ and $d'$, which project laterally from the body of the tire on both sides of the tread portion and extend throughout the length of the tire. These flanges are provided for the purpose of supporting the usual retaining members $e$ $e'$, which are preferably formed of wire bent into hoop shape and joined at their ends, thus completely encircling the flanges and wheel-rim, holding the tire securely in the rim-channel.

In order to stiffen the base portion of the tire to prevent the latter and the flanges yielding to a great enough extent to permit one of the flanges being pulled out from beneath a retaining-wire, I provide a stiffener or stiffeners $f$, made, preferably, in the form of a frame having longitudinal side bars $f'$ $f^2$ and cross-bars $f^3$, which join the side bars, being preferably integral therewith, holding them at their proper distance apart. The side bars are held separated to such an extent as to bring their outer portions beneath the upper surfaces of the flanges which support the retaining-wires. Thus the extreme width of the stiffener is greater than that between the retaining-wires, and as the stiffener is of metal and unyielding it cannot pass between the retaining-wires when they are in place, and so it acts to hold the base portion of the tire extended laterally and prevents it from being compressed sufficiently to pull out from under the retaining-wires.

The side bars $f'$ $f^2$ are preferably comparatively flat and thin in cross-section and are located in the tire with their widest dimensions parallel with the base of the tire, whereby they are enabled to spring slightly whenever under the conditions of use a slight yielding transversely of their length is necessary.

The cross-bars are separated from each other by relatively wide intervals and at those portions where they unite with the side bars are bent sharply outward or upward away from the side bars toward the tread of the tire, the central or intermediate portions of the cross-bars thus being displaced upward, converting the cross-bars into arches. This displacement of the cross-bars allows them to be deeply embedded in the rubber of the tire, while at the same time the side bars are located near the bottom surface, being embedded only a sufficient distance in the tire to provide a thin cushion of rubber between them and the surface of the tire, and thus permitting a cushion of comparatively great thickness to be interposed between the upper surfaces of the side bars and the retaining-wires. At the same time the comparatively great distance by which the cross-bars are separated allows the rubber of the tire to surround these bars and to be firmly and homogeneously united with the rubber both above and beneath the stiffener.

The arched formation of the bars is of advantage for the further reason that it increases the stiffness of the latter, since it causes those portions of the cross-bars which join the longitudinal bars to extend therefrom at an acute angle to the base of the tire.

Inasmuch as the pull which is exerted on either side of the tire tending to draw the flanges under the retaining-wires is in a direction inclined at an acute angle to the rim of the wheel and in a general direction toward the opposite side of the wheel-rim, the inclinations at which the cross-bars join the longitudinal bars are substantially the same as these directions of pull. Thus such a pull acts to produce a direct compression stress upon the cross-bars without tending to bend the latter at all.

The stiffener g (shown in Fig. 4) has the side bars g' g² and the cross-bar g³, these three members being integrally joined together and forming a single detached stiffener, the side bars being short compared to the side bars of the stiffener f and being united only by a single cross-bar. Whereas there would only be two or three of the frame-shaped stiffeners f used in the whole extent of the tire, these stiffeners being shaped in the form of an arc and extending over a half or a third of the circumference of a circle, a large number of the stiffeners g will be used, placed at short distances throughout the length of the tire. With the detached stiffeners a single standard size and shape may be used with a relatively wide range of tires of different sizes, while with the stiffeners f each stiffener has to be formed with a particular shape to adapt it to the tire for which it is intended to be used.

To the upper surfaces of the flanges and extending upward along the sides of the tread portion of the tire a slight distance above the point of engagement of the retaining-wires therewith are attached binding members h h' of frictioned fabric, which are united to the rubber of the tire by vulcanization. These binding members may be separate strips of fabric or they may be, and this is the preferred construction, formed as extensions of the usual fabric cover i, extending over the bottom and sides of the base portion. These binding members h h' firmly tie the flanges to the body of the tire and prevent them tearing away when a lateral strain is given to the tread. This tendency of the flange, which is held tightly by the retaining-wire, to tear away from the body of the tire when the tread is pulled laterally causes a great deal of trouble, as the tearing away from the flange above referred to is of frequent occurrence and causes the ruining of an otherwise perfectly good tire. By this invention of the binding-pieces, therefore, I have provided a means by which the durability of a tire is greatly increased.

The construction of the stiffeners having the side bars extending longitudinally of the tire and parallel with the wire-engaging surfaces of the flanges and the cross-bars having their central parts displaced toward the tread of the tire, which provides the cushion of rubber between the retaining-wires and the side bars, while at the same time permitting the cross-bars to be deeply embedded in the rubber, is designed to cure the objectionable features of stiffeners now in use. There have been stiffening-wires embedded in the tire extending transversely thereof; but the ends of these wires rub against the retaining-wires and in a short time either become worn through or wear such deep grooves where they engage the stiffening-wires that the latter become useless, so that it frequently happens that two or three sets of retaining-wires have to be applied to a tire before the latter is worn out. Even where a cushion of rubber is left between the ends of the stiffening-wires and the retaining-wires this objection is not avoided, because the stiffening-wires having no broad bearing portions quickly cut through the rubber flanges and engage directly against the stiffening-wires. With my construction, however, this is not possible, since the upper surfaces of the stiffener-bars present such a wide area after they are vulcanized in the tire that it is impossible for them to work through the rubber and engage the retaining-wires.

Perforated plates embedded in the rubber and having lateral portions engaging the retaining-wires have also been used; but these are objectionable for the reason that they also when they engage directly with the retaining-wires cause unnecessarily great wear on the wires, and when they are separated from the wires they weaken the tire, for the reason that the tongues of rubber extending through the perforations in the plates are not of sufficient strength to securely unite the portions of the tire on opposite sides of the plate, so that the tread and base portions are liable to separate. There is no chance of this result occurring with my stiffener, however, inasmuch as the areas of the rubber portions extending through the spaces between the cross-bars are much greater than those of the bars themselves and also because the main portions of the cross-bars are out of line with the side bars.

Wherever in the preceding description the terms "top," "bottom," "upper," "lower," &c., are used they are intended to be understood in connection with Fig. 1, wherein the tread-surface of that portion of the tire which is there illustrated is at the top of the figure and the base portion at the bottom. Of course a section taken at the under side of a wheel where the tire is in contact with the ground would be reversed; but for convenience terms have been used which apply to the arrangement of Fig. 1.

I claim—

1. A tire comprising a strip of rubber having flanges upon each side of the tread portion supporting the retaining-wires, and a stiffener consisting of rigid longitudinal side bars located in the base portion of the tire beneath the flanges with their widest dimensions parallel to the base, there being thick cushions of rubber between the side bars and the wire-engaging surfaces of the flanges, and a cross-bar joined to the side bars and embedded in the rubber.

2. A tire comprising a strip of rubber having flanges upon each side of the tread portion for supporting the retaining-wires, and a stiffener consisting of rigid, flat metallic side bars extending longitudinally of the tire and embedded therein closely adjacent the side and base surfaces thereof, and a cross-bar joined to the side bars, bent sharply toward the tread-surface of the tire and embedded in the rubber, whereby the stiffener is securely connected to the tire and cushions of rubber are provided between the wire-engaging surfaces of the flanges and the side bars of the stiffener.

3. A tire comprising a continuous strip of rubber having a tread portion and a base portion extended on both sides of the tread portion to form flanges for supporting retaining bands or wires, and a stiffener consisting of a rigid metallic frame or grid having side bars extending longitudinally of the tire located at the sides thereof beneath the wire-engaging surfaces of the flanges, and cross-bars joined to the side bars, said cross-bars being displaced at their intermediate portions toward the tread-surface of the tire and separated from each other by relatively wide spaces, whereby they are completely surrounded by and deeply embedded in the rubber of the tire while a thick cushion is provided between the wire-engaging surfaces of the flanges and the side bars.

4. A tire comprising a continuous strip of rubber having a tread portion and a base portion extended on both sides of the tread portion to form flanges for supporting retaining bands or wires, a stiffener consisting of a rigid metallic frame or grid embedded in the base portion of the tire, and a fabric covering extending around the base portion of the tire and over the wire-engaging surfaces of the flanges.

5. A rubber tire having a tread portion and a base portion formed with lateral flanges, a fabric covering extending over the side and upper surfaces of the flanges and the sides of the said tread portion adjacent the flanges and vulcanized to the tire, and a stiffener consisting of side bars embedded in the sides of the base portion, extending longitudinally thereof, and a cross-bar joined to said side bars and embedded in the tire.

6. The combination with a wheel-rim channel of a rubber tire formed with a tread portion and a base portion, the latter having flanges projecting beside the tread portion and seated in the rim-channel, retaining-wires surrounding and engaged with the outer surfaces of the said flanges, binding members of frictioned fabric vulcanized to the tire extending over the wire-engaging surfaces of the flanges between the wires and the rubber and upon the sides of the tread portion, the said binding members being carried outward on the sides of the tread portion beyond the wires, whereby the tendency of the flanges to tear away from the body of the tire is resisted, and a stiffener embedded in the base portion beneath and out of contact with the retaining-wires.

7. The combination with a vehicle-wheel rim, of a rubber tire having lateral flanges at its base adapted to seat in the rim and to support longitudinal retaining-wires, stiffening members embedded in the tire close to the base-surface beneath the retaining-wires, and compression members extending transversely of the tire from one stiffening member to the other, connected to hold them apart, and arched to exert the maximum resistance to compression stresses.

In testimony whereof I have affixed my signature in presence of two witnesses.

HUGH R. AULD.

Witnesses:
  E. T. GRAHAM,
  A. C. RATIGAN.